United States Patent [19]

Yamada et al.

[11] Patent Number: 4,904,512
[45] Date of Patent: Feb. 27, 1990

[54] COMPRESSION-MOLDED ARTICLE HAVING MULTILAYER STRUCTURE

[75] Inventors: Muneki Yamada, Fujisawa; Kiyoshi Kawaguchi, Yokohama, both of Japan

[73] Assignee: Toyo Seikan Kaisha, Ltd., Tokyo, Japan

[21] Appl. No.: 9,974

[22] Filed: Feb. 2, 1987

[30] Foreign Application Priority Data

Feb. 10, 1986 [JP] Japan ................ 25832/86

[51] Int. Cl.⁴ .............. B65D 85/84; B29C 43/08
[52] U.S. Cl. .................. 428/36.7; 428/36.6;
  428/412; 428/516; 428/518; 428/475.2;
  428/495.8; 428/476.1; 428/476.3; 428/483;
  264/249; 264/260; 264/263; 425/145; 426/127
[58] Field of Search .............. 428/35, 412, 516, 76,
  428/518, 520, 476.1, 476.3, 483, 475.8, 36.7,
  36.6; 264/249, 260, 263

[56] References Cited

U.S. PATENT DOCUMENTS

| | | | |
|---|---|---|---|
| 3,532,779 | 10/1970 | Wienand | 264/90 |
| 3,589,975 | 6/1971 | Erb | 428/215 |
| 4,497,765 | 2/1985 | Wilde et al. | 264/268 |
| 4,525,134 | 6/1985 | McHenry | 425/130 |
| 4,526,821 | 7/1985 | McHenry | 428/35 |
| 4,528,221 | 7/1985 | Komatsuzaki et al. | 428/35 |
| 4,568,261 | 2/1986 | McHenry | 425/145 |
| 4,572,856 | 2/1986 | Gembinski | 428/76 |
| 4,663,226 | 5/1987 | Vajs et al. | 428/76 |

FOREIGN PATENT DOCUMENTS

| | | |
|---|---|---|
| 57-026216 | 3/1982 | Japan . |
| 0099171 | 1/1984 | Japan . |
| 2557499 | 7/1985 | Japan . |
| 0205157 | 12/1986 | Japan . |
| 7201123 | 8/1972 | Netherlands ............ 428/76 |

*Primary Examiner*—P. C. Ives
*Attorney, Agent, or Firm*—Beveridge, DeGrandi & Weilacher

[57] ABSTRACT

A multilayer compression-molded article produced by compression-molding a composite plastic material. The composite plastic material comprises a first synthetic resin and a second synthetic resin in which the first synthetic resin surrounds substantially the entire second synthetic resin. The compression-molded article comprises a first resin layer molded from the first synthetic resin and a second resin layer molded from the second synthetic resin in which the first resin layer surrounds substantially the entire second resin layer. The composite plastic material is obtained by an extrusion apparatus which intermittently extrudes the second synthetic resin via a subsidiary extrusion flow passage into a main extrusion flow passage in which the first synthetic resin flows.

6 Claims, 2 Drawing Sheets

COMPRESSION-MOLDED ARTICLE HAVING MULTILAYER STRUCTURE

BACKGROUND OF THE INVENTION

1. Field of the Invention

This invention relates to a compression-molded plastic article having a multilayer structure which is conveniently embodied in container closures, container closure liners or containers, a method for production thereof, and to an apparatus conveniently used in the method of production.

2. Description of the Prior Art

It is well known to those skilled in the art that there has been a widespread practice to mold containers for drinks and foods, closures therefor and liners for closures or like articles from synthetic resins. In the early stage of this practice, such articles were molded by injection molding. The injection molding technique, however, was found to have difficulty in producting these articles at high speeds and low costs enough to achieve industrial and commercial success. From this viewpoint, it has recently been proposed, and come into commercial acceptance, to produce these articles by a compression molding technique (see, for example, Japanese Laid-Open Patent Publication No. 245517/1985).

Generally, synthetic resins having low gas-barrier property, such as olefinic resins, are selected as raw materials for these products to be molded by compression molding (or injection molding) in view of their excellent mechanical properties and hygienic property. When a container molded from such a material holds a carbonated beverage such as a carbonated soft drink or beer, carbon dioxide gas may leak through the container wall because of its low gas barrier property In the field of producing containers by first producing a preform by injection molding or extrusion molding and then stretch blow-molding the preform, it has been proposed to provide a preform of a laminated structure composed of a layer of a resin having low gas-barrier property such as an olefinic resin and a layer of a resin having high gas-barrier property such as an olefin/vinyl alcohol copolymer in an attempt to solve the aforesaid problem of gas leakage.

The present inventors previously produced a compression-molded article of a laminated structure in the following manner in an attempt to solve the above problem of gas-barrier property in the production of containers or the like by the compression-molding technique. Specifically, the present inventors produced such an article by extruding a heat-molten synthetic resin material having a laminated structure comprising a first synthetic resin having low gas-barrier property and a second synthetic resin having high gas-barrier property laminated to one surface of the first resin by using a known lamination-extrusion device having the type disclosed in Japanese Patent Publication No. 3837/1953, and then compression-molding the extruded synthetic resin material having the laminated structure to form a compression-molded article of a laminated structure composed of an inside resin layer of the first synthetic resin and an outside resin layer of the second synthetic resin.

It has been found however that this compression-molded article of a laminated structure easily undergoes delamination between the inside resin layer and the outside resin layer, and is not commercially acceptable.

SUMMARY OF THE INVENTION

A first object of this invention is to provide a novel and excellent compression-molded article of a laminated structure in which the aforesaid problem of gas-barrier property and the aforesaid problem of delamination are solved.

A second object of this invention is to provide a novel and excellent method for conveniently producing the aforesaid compression-molded article having a multilayer structure.

A third object of this invention is to provide an apparatus which can be used conveniently in practicing the above method.

Extensive investigations of the present inventors have led to the discovery that the first object of the invention can be achieved by a compression-molded article of a multilayer structure which is composed of a first synthetic resin layer and a second synthetic resin layer, the first layer surrounding substantially the entire second resin layer, instead of merely laminating the first resin layer and the second resin layer.

The present inventors have also found that the compression-molded article having a multilayer structure can be conveniently produced by intermittently extruding a second synthetic resin in the heat-molten state into a main extrusion flow passage in which a first synthetic resin in the heat-molten state flows and thus extruding a composite plastic material composed of the second synthetic resin and the first synthetic resin surrounding substantially the entire second resin from an extrusion opening of the main extrusion flow passage, and thereafater compression-molding the composite plastic material.

The present inventors have further found that the aforesaid composite plastic material can be obtained conveniently by a composite synthetic resin extruding apparatus in which an extrusion opening of a subsidiary extrusion flow passage connected to a second extruder for a second synthetic resin is provided in a main extrusion flow passage connected to a first extruder for a first synthetic resin so that the second synthetic resin is intermittently extruded into the main extrusion flow passage from the extrusion opening of the subsidiary extrusion flow passage.

With regard to the first object, the present invention provides a compression-molded article having a multilayer structure comprising a first resin layer molded from a first synthetic resin and a second resin layer molded from a second synthetic resin, said first resin layer surrounding substantially the entire second resin layer, said article being produced by compression-molding of a heat-molten composite plastic material comprising the first and second synthetic resins which are dissimilar.

With regard to the second object, the present invention provides a method for producing a compression-molded article having a multilayer structure comprising a first resin layer molded from a first synthetic resin and a second resin layer molded from a second synthetic resin, said first resin layer surrounding substantially the entire second resin layer and said first and second synthetic resins being dissimilar; which comprises intermittently extruding the second synthetic resin in the heat-molten state into a main extrusion flow passage in which the first synthetic resin in the heat-molten state flows, thereby to surround substantially the entire extruded second synthetic resin by the first synthetic resin, and extruding the second synthetic resin and the first synthetic resin surrounding substantially the entire second resin from an extrusion opening in the main extrusion flow passage to form a composite plastic material, and compression-molding the composite plastic material to mold the first resin layer from the first synthetic resin and the second resin layer from the second synthetic resin.

With regard to the third object, the present invention provides a composite synthetic resin extruding apparatus for producing a composite plastic material, comprising a first extruder for heat-melting a first synthetic resin and feeding it, a second extruder for heat-melting a second synthetic resin which is different from the first synthetic resin and feeding it, a main extrusion flow passage connected to the first extruder and a subsidiary extrusion flow passage connected to the second extruder, the subsidiary extrusion flow passage having an extrusion opening disposed within the main extrusion flow passage, whereby the second synthetic resin is intermittently extruded from the extrusion opening of the subsidiary extrusion flow passage into the main extrusion flow passage in which the first synthetic resin flows, substantially the entire extruded second synthetic resin is surrounded by the first synthetic resin, and the second synthetic resin and the first synthetic resin surrounding substantially the entire second synthetic resin are extruded from the extrusion opening of the main extrusion flow passage.

DETAILED DESCRIPTION OF PREFERRED EMBODIMENTS

With reference to the accompanying drawings, preferred embodiments of the invention will be described below in detail.

Multilayer compression-molded article

Figure 1:
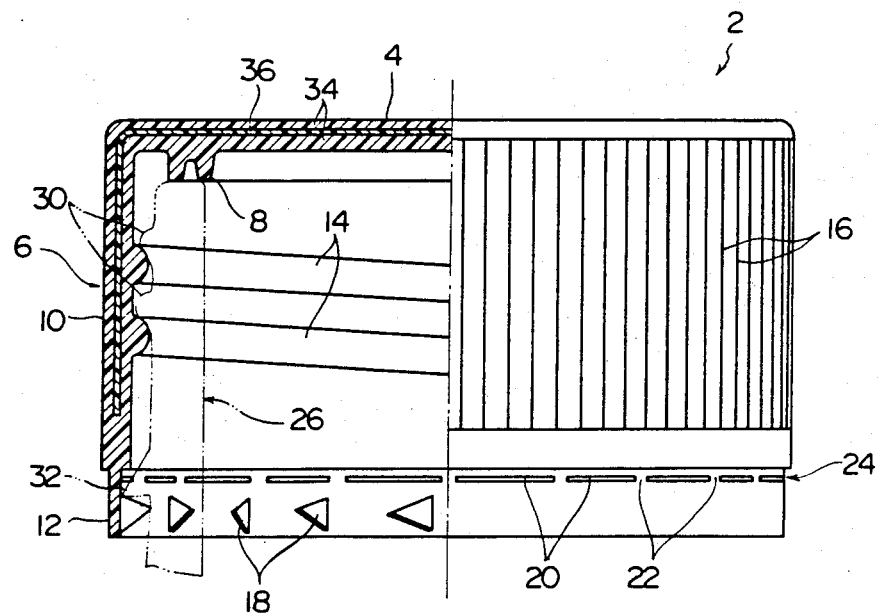
FIG. 1 is a side elevation, partly in section, of one example of a container closure which is one specific embodiment of the multilayer compression-molded article of the invention.

FIG. 1 shows one example of a container closure which is one specific embodiment of the multilayer compression-molded article of this invention. The illustrated container closure shown generally at 2 has a circular top panel wall 4 and a cylindrical skirt wall extending downwardly from the peripheral edge of the top panel wall 4. An annular sealing protrusion 8 is formed on the inside surface of the top panel wall 4. The skirt wall 6 has a relatively thick main portion 10 and a relatively thin pilfer-proof bottom portion 12. An internal thread 14 is formed on the inside surface of the main portion 10 of the skirt wall 6. On the outside surface of the main portion 10, a number of circumferentially spaced slip-preventing protrusions 16 are formed. A plurality of circumferentially spaced, radially inwardly projecting flaps 18 are formed on the inside surface of the pilfer-proof bottom portion 12. A plurality of slits 20 extending circumferentially at some intervals are formed in the upper end portion of the pilfer-proof bottom portion 12 to define a circumferentially breakable line 24 consisting of the slits 20 and bridging portions 22 left among the slits 20. The slits 20 may be formed at the time of compression-molding of the container closure 2 as stated hereinbelow. Conveniently, however, they can be formed by exerting a cutting action on the upper end portion of the pilfer-proof bottom portion 12 at some circumferential intervals by means of a suitable cutting device after the closure 2 is formed by compression molding.

The container closure 2 is applied to a container such as a glass or plastic bottle having a mouth-neck portion 26 of the form shown by a two-dot chain line in FIG. 1. An external thread 30 and an annular jaw portion 32 beneath it are formed on the outer circumferential surface of the mouth-neck portion 26 which is generally cylindrical. When the container closure 2 is mounted in position on the mouth-neck portion 26 as shown in FIG. 1, the internal thread 14 is fitted with the external thread 30, and the flaps 18 which go past the annular jaw portion 32 by being elastically bent radially outwardly come into engagement with the under surface of the annular jaw portion 32. As a result, the sealing protrusion 8 comes into intimate contact with the upper end of the mouth-neck portion 26. In opening the mouth-neck portion 26, the breakable line 24 (more specifically its bridgeing portions 22) is broken, and then, that portion of the closure 2 which is above the broken line 24 is removed from the mouth-neck portion 26.

The above-described structure itself of the container closure 2 is only one example and is known. Its detailed description, therefore, is omitted in the present specification.

The container closure 2 as one specific embodiment of the multilayer compression-molded article of the invention is produced by compression-molding a heat-molten composite plastic material comprising a first and a second synthetic resin which are dissimilar (the method of its production will be described hereinbelow). It is important that the closure has a first resin layer 34 and a second resin layer 36, and in addition, the first resin layer 34 surrounds substantially the entire second resin layer. In the illustrated container closure, the second resin layer 36 has a circular portion extending in the top panel wall 4, and a cylindrical portion extending downwardly from the peripheral edge of the circular portion to the lower portion of the main portion 10 in the skirt wall 6. The first resin layer 34 surrounds substantially the entire second resin layer 36; specifically, it surrounds not only the inside and outside surfaces of the circular portion and the cylindrical portion, but also the lower edge of the circular portion. In other words, the second resin layer 36 is completely enveloped by the first synthetic resin layer 34 and is not exposed to view. Because of this structure, it will be easily understood that there is no likelihood at all of the occurrence of delamination between the first resin layer 34 and the second resin layer 36.

The first synthetic resin forming the first resin layer 34 is suitably any of those thermoplastic synthetic resins which are generally used in the production of container closures, closure liners and containers in view of their excellent mechanical properties and hygienic property.

Examples of suitable thermoplastic resins include olefinic resins, for example home- and co-polymers of ethylene, propylene, butene-1, pentene-1 and 4-methylpentene-1, copolymers of these olefins with a minor proportion, generally 0.05 to 10% by weight, of other ethylenically unsaturated monomers such as vinyl acetate and acrylic esters, and blends of these olefinic polymers or copolymers; styrene resins such as polystyrene, copolymers of styrene with unsaturated monomers such as butadiene, acrylonitrile, acrylic acid, methyl acrylate, methyl methacrylate and alpha-methylstyrene, and blends of these polymers or copolymers; acrylic resins and methacrylic resins; polyester resins such as polyethylene terephthalate; and polycarbonate resins. Of these, the olefinic resins are preferred.

The above resins suitable as the first synthetic resin have low gas-barrier property, and to make up for this weak point, the second synthetic resin forming the second resin layer 36 is desirably a thermoplastic synthetic resin having high gas-barrier property. Examples of suitable thermoplastic resins having high gas-barrier property include olefin/vinyl alcohol copolymers such as olefin/vinyl alcohol copolymers containing 40 to 80 mole % of vinyl alcohol and not more than 4 mole %, based on the total amount of vinyl alcohol and vinyl ester, of the residual vinyl ester, and blends of the olefin/vinyl alcohol copolymers and other thermoplastic synthetic resins; polyamide resins, for example homopolyamides, copolyamides or blends thereof, more specifically aliphatic polyamides such as nylon 6, nylon 6.6, nylon 6.10 and nylon 6/6.6 copolymer, and aromatic polyamides prepared from metaxylylenediamine and alpha, omega-aliphatic dicarboxylic acids having 6 to 10 carbon atoms; high-barrier polyester resin such as poly (ethylene terephthalate isophthalate) copolymer; nitrile resins such as copolymers of 40 to 97 mole %, generally 60 to 86 mole %, based on the entire polymer, of nitrile group-containing ethylenically unsaturated monomers such as acrylonitrile, methacrylonitrile or a mixture thereof, with one or more comonomers such as conjugated dienes (e.g., butadiene or isoprene), esters of ethylenically unsaturated carboxylic acids (e.g., methyl methacrylate, ethyl acrylate or ethyl methacrylate), vinyl ethers such as methyl vinyl ether, and monovinyl aromatic hydrocarbons (e.g., styrene or vinyltoluene); and vinyl chloride or vinylidene chloride resins, for example homopolymers of vinyl chloride or vinylidene chloride and copolymers of these with each other or with other monomers, such as polyvinyl chloride, vinyl chloride/vinylidene chloride copylymer or vinylidene chloride/methyl acrylate copolymer.

In view of the method of production to be described hereinafter, when the first synthetic resin is an olefinic resin (melting point 100° to 170° C.), the first synthetic resin is preferably an ethylene/vinyl alcohol copolymer (melting point 134°–199° C.), nylon 6/6.6 copolymer (melting point 180°–250° C.) or a vinylidene chloride-type resin (melting point 160°–175° C.) which has a melting point close to the melting point of the first synthetic resin.

If the closure 2 shown in FIG. 1 is composed only of the first resin layer 34 without including the second resin layer 36 and is applied to a container holding carbonated beverages such as beer or a soft carbonated drink, carbon dioxide may permeate through the closure, mainly through the top panel wall 4, owing to the low gas-barrier property of the first resin layer 34. The existence of the second resin layer 36 having high gas-barrier property in the first resin layer 36 makes it possible to prevent the carbon dioxide gas leakage completely.

Figure 2:
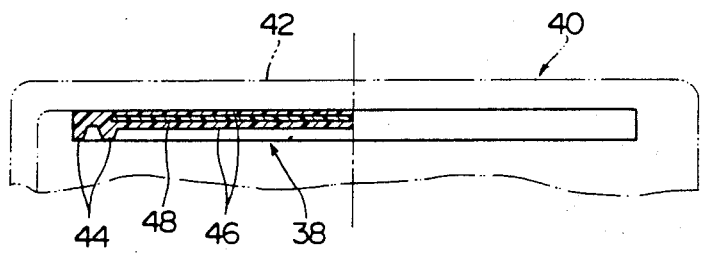
FIG. 2 is a side elevation, partly in section, of one example of a liner for container closures which is another specific embodiment of the multilayer compression-molded article of the invention.

FIG. 2 shows an example of a liner for container closures which is another specific embodiment of the multilayer compression-molded article of the invention. The liner shown generally at 38 may be formed on the inside surface of the top panel wall 42 of a closure 40 which may be of a suitable type by direct compression molding, or by separately forming the liner by compression molding and attaching it to the inside surface of the top panel wall 42. The container closure 40 itself may be made of a synthetic resin having excellent mechanical properties and hygienic property but low gas-barrier property, such as the same thermoplastic synthetic resin as one forming the first resin layer of the closure 2 shown in FIG. 1. The illustrated liner 38 is generally of a disc shape, and the peripheral edge of its lower surface has a sealing protrusion 44 adapted to be in close contact with the upper end of the mouth-neck portion (not shown) of the container.

The liner 38 which is another specific embodiment of the multilayer compression-molded article of the invention is produced by compression-molding a heat-molten composition plastic material comprising a first synthetic resin and a second synthetic resin which are dissimilar (the method of production will be described hereinafter). It is important that the liner 38 comprises a first resin layer 46 and a second resin layer 48, and the first resin layer 46 surrounds substantially the entire second resin layer 48. In the illustrated embodiment, the second resin layer 48 is a disc-like layer extending in the central portion of the liner 38, and the first resin layer 46 completely surrounds not only the upper and lower surfaces of the second resin layer 48 but also its peripheral edge. In other words, the second resin layer 48 is completely enveloped by the first resin layer 46 and is not exposed to view. It will be easily understood that because of this structure, there is no likelihood at all of the occurrence of delamination between the first resin layer 46 and the second resin layer 48.

The first synthetic resin forming the first resin layer 46, like the first synthetic resin forming the first resin layer 34 of the closure 2 shown in FIG. 1, is preferably a thermoplastic synthetic resin having excellent mechanical properties, economy and hygienic property. The second synthetic resin forming the second resin layer 48, like the second resin forming the second resin layer 36 of the closure 2 shown in FIG. 1, is preferably a thermoplastic resin having high gas-barrier property.

If the liner 38 shown in FIG. 2 is composed only of the first resin layer 46 without including the second resin layer 48 and is applied to a closure for a container holding carbonated beverages such as beer or a soft carbonated drink, carbon dioxide may permeate through the closure, mainly through the central portion of the liner 38 and the top panel wall 42 of the closure 40. The existence of the second resin layer 48 having high gas-barrier property in the first resin layer 46 makes it possible to prevent the carbon dioxide gas leakage completely.

Figure 3:
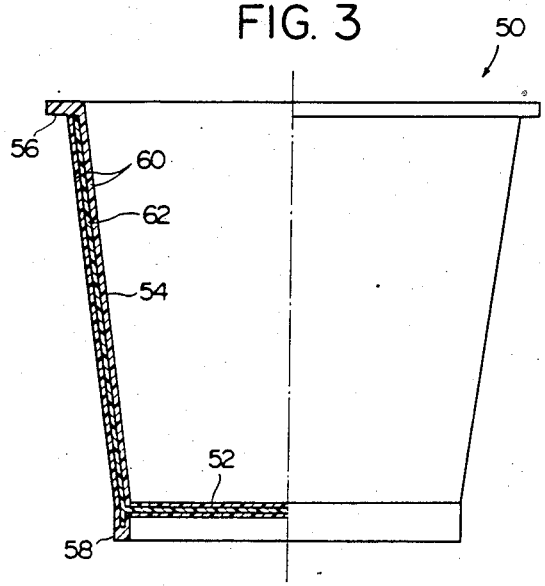
FIG. 3 is a side elevation, partly in section, of one example of a container which is still another specific embodiment of the multilayer compression-molded article.

FIG. 3 shows one example of a container which is still another specific embodiment of the multilayer compression-molded article of this invention. The illustrated container shown generally at 50 has a circular bottom wall 52, a frustoconical side wall 54 extending upwardly from the peripheral edge of the bottom wall 52 while it is inclined slightly radially outwardly, an annular flange 56 projecting radially outwardly from the upper end of the side wall 54 and a cylindrical leg wall 58 extending substantially vertically from the bottom wall 52. The open top surface of the container 50 may be closed and sealed with a suitable closure (not shown) which may be a thin metalic closure, or the closure as an embodiment of the compression-molded article of a multilayer structure in accordance with this invention.

The container 50 is still another embodiment of the multilayer compression-molded article of this invention is also produced by compression-molding a heat-molten composite plastic material comprising a first synthetic resin and a second synthetic resin which are dissimilar (the method of production will be described hereinafter). It is important that the container 50 comprises a first resin layer 60 and a second resin layer 62, and the first resin layer 60 surrounds substantially the entire second resin layer. In the illustrated container 50, the second resin layer 62 has a circular portion extending in the bottom wall 52, a frustoconical portion extending upwardly from the peripheral edge of this circular portion through the side wall 54 to the upper end portion of the side wall 54, and a cylindrical portion extending downwardly from the peripheral edge of the circular portion through the leg wall 58 to near the lower end of the leg wall 58. The first resin layer 60 completely surrounds not only the inside and outside surfaces of the circular portion, the frustoconical portion and the cylindrical portion, but also the upper edge of the circular portion and the lower edge of the cylindrical portion. In other words, the second resin layer 62 is completely enveloped by the first resin layer 60 and is not exposed to view. It will be readily understood that because of this structure, there is no likelihood at all of the occurrence of delamination between the first resin layer 60 and the second resin layer 62.

The first synthetic resin forming the first resin layer 60, like the first synthetic resin forming the first resin layer 34 of the closure 2 shown in FIG. 1, is preferably a thermoplastic synthetic resin having excellent mechanical properties, economy and hygienic property. The second synthetic resin forming the second resin layer 62, like the second synthetic resin forming the second resin layer 36 of the closure 2 shown in FIG. 1, is preferably a thermoplastic resin having high gas-barrier property.

If the container 50 shown in FIG. 3 is composed only of the first resin layer 60 without including the second resin layer 62 and used for holding carbonated beverages such as beer and a carbonated soft drink, carbon dioxide gas may permeate through the container, mainly through the bottom wall 52 and the side wall 54. The existence of the second resin layer 62 having high gas-barrier property in the first resin layer 60 makes it possible to prevent the carbon dioxide gas leakage completely.

Method of production and apparatus for extruding composite synthetic resins

Figure 4:
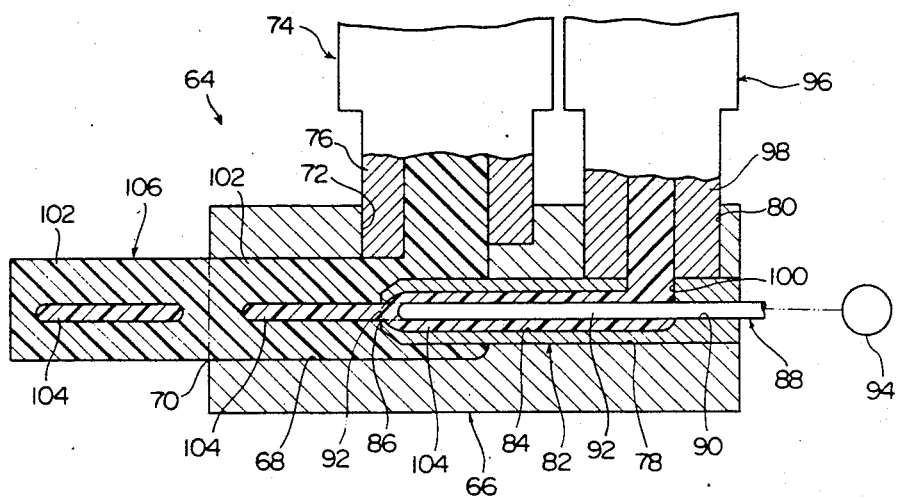
FIG. 4 is a sectional view showing the principal parts of the composite synthetic resin extruding apparatus of the invention.

FIG. 4 shows the essential parts of a composite synthetic resin extruding apparatus suitable for obtaining a composite plastic material used conveniently in the production of the multilayer compression-molded article of this invention such as the closure 2 shown in FIG. 1, the liner 38 shown in FIG. 2 or the container 50 shown in FIG. 3. The extruding apparatus shown generally at 64 has a member 66 defining a main extrusion flow passage. In the front half (the left half in FIG. 4) of the member 66 which is nearly cylindrical, a main extrusion flow passage 68 which is conveniently circular in section is formed. The front end (the left end in FIG. 4) of the main extrusion flow passage 68 is opened to define an extrusion opening 70. A first connecting hole 72 extending upwardly from the rear end portion of the main extrusion flow passage is formed in the member 66. A discharge opening portion 76 of a first extruder 74 which is of any known type is fitted in the first connecting hole 72 to provide communication between the discharge opening portion 76 of the first extruder 74 and the rear end portion of the main extrusion flow passage 68. Furthermore, a fitting hole 78 following the rear end of the main extrusion flow passage 68 and extending to the rear end of the member 66 and a second connecting hole 80 extending upwardly from the rear end portion of the mounting hole 78 are also formed in the member 66. The fitting hole 78 has circular cross-sectional shape with a slightly smaller inside diameter than the inside diameter of the main extrusion flow passage 68 and is preferably disposed concentrically with the main extrusion flow passage 68. A nearly clindrical subsidiary extrusion flow passage-defining member 82 is fitted in the fitting hole 78. The front end portion (the left end portion in FIG. 4) of this member 82 projects concentrically into the main extrusion flow passage 68. A subsidiary extrusion flow passage 84 is formed in the member 82 extending from its front end to a point near its rear end portion. Preferably, the subsidiary extrusion flow passage 84 has a circular cross-sectional shape, and a small-diameter extrusion opening 86 is defined in its front end portion. An opening-closing means 88 is annexed to the subsidiary extrusion flow passage 84 to open or close the extrusion opening 86 selectively. The illustrated opening-closing means 88 includes a sliding valve rod 92 inserted in the subsidiary extrusion flow passage 84 via a small-diameter insertion hole 90 formed in the rear end portion of the member 82. The rear end of the rod 92 is linked to a driving source 94 via a suitable linking mechanism (not shown). The driving source 94 slides the sliding valve rod 92 selectively in the left or right direction in FIG. 4 and holds it selectively at an open position at which its front end is away rearwardly from the extrusion opening 86 as shown by a solid line and a closed position at which its front end advances into the extrusion opening 86 to close it as shown by a two-dot chain line. A discharge opening portion 98 of a second extruder 96 which may be of any known type is fitted in the second connecting hole 80 formed in the member 66. With regard to the discharge opening portion 98, a communication hole 100 extending upwardly from the rear end portion of the subsidiary extrusion flow passage 84 is formed in the member 82, and via the communication hole 100, the discharge opening portion 98 of the second extruder 96 is caused to communicate with the rear end portion of the subsidiary extrusion flow passage 84.

The operation of the composite synthetic resin extruding apparatus 64 will be described below. A first synthetic resin 102 in the heat-molten state discharged from the discharge opening portion 76 of the first extruder 74 flows into the main extrusion flow passage 68 and moves continuously in the main extrusion flow passage 68 toward the extrusion opening 70. In the meantime, a second synthetic resin 104 in the heat-molten state discharged from the discharge opening 98 of the second extruder 96 flows into the subsidiary extrusion flow passage 84 and moves in the subsidiary extrusion flow passage 84 toward the extrusion opening 86. According to the intermittent opening of the extrusion opening 86 by the opening-closing means 88, the second synthetic resin 104 is extruded intermittently into the main extrusion flow passage 68 from the extrusion opening 86, and therefore, into the first synthetic resin 102 flowing in the main extrusion flow passage 68. Consequently, while flowing in the main extrusion flow opening 68, the second synthetic resin 104 extruded intermittently is substantially entirely surrounded by the first synthetic resin 102, and a composite plastic material 106 composed of the second synthetic resin 104 and the first synthetic resin 102 surrounding substantially the entire second synthetic resin is extruded from the extrusion opening 70. When the second extruder 96 is continuously operated and therefore the second synthetic resin 104 is continuously discharged from the discharge opening portion 98 of the second extruder 96, a molten resin accumulator of any known type may, as required, be disposed between the subsidiary extrusion flow passage 84 (from the extrusion opening 86 of which the second synthetic resin 104 is intermittently extruded) and the discharge opening portion 98 of the second extruder 96.

The multilayer compression-molded article of this invention, such as the closure 2 shown in FIG. 1, the liner 38 shown in FIG. 2 or the container 50 shown in FIG. 3, can be conveniently produced by cutting off the composite plastic material 106 extruded from the extruding apparatus 64 by, for example, a cutting blade (not shown) moving across the extrusion opening 70, and compression-molding the cut composite plastic material 106 into the desired shape by a suitable compression-molding apparatus (not shown). It will be readily seen that compression-molding of the composite plastic material 106 composed of the second synthetic resin 104 and the first synthetic resin 102 surrounding substantially the entire second synthetic resin 104 gives a multilayer compression-molded article composed of a second resin layer formed of the second synthetic resin 104 and a first resin layer formed of the first synthetic resin 102 and surrounding substantially the entire second resin layer.

While the present invention has been described in detail hereinabove with regard to specific preferred embodiment taken in conjunction with the accompanying drawings, it should be understood that the invention is not limited to these preferred embodiments, and various changes and modifications are possible without departing from the scope of the invention.

For example, the present invention has been described with regard to a two-layer compression-molded article composed of a first and second resin layer, the present application can be applied to a three-layer compression molded article which is composed of a first, a second and a third resin layer and in which the second resin layer surrounds substantially the entire third resin layer and the first resin layer surrounds substantially the entire second resin layer, or to compression-molded articles having four or more layers of a similar structure.

What is claimed is:

1. A compression-molded article having a multilayer structure comprising a first resin layer molded from a first synthetic resin and a second resin layer molded from a second synthetic resin, said first and second synthetic resins being dissimilar, said first resin layer completely surrounding the entire second resin layer, said article being produced by compression-molding of a heat-molten composite plastic material formed by intermittently extruding the second synthetic resin, in molten condition, into a main extrusion flow path for the first synthetic resin whereby the first resin, in molten condition, completely surrounds the second resin, and thereafter extruding the composite plastic through an extrusion opening in the main extrusion flow passage with the first resin completely surrounding the second resin.

2. The compression-molded article of claim 1 wherein the first synthetic resin is an olefinic resin, a styrene-type resin, an acrylic resin, a methacrylic resin, a polyester-type resin or a polycarbonate resin.

3. The compression-molded article of claim 2 wherein the second synthetic resin is an olefin/vinyl alcohol copolymer, a polyamide resin, a high-barrier polyester-type resin, a nitrile-type resin, a vinyl chloride-type resin or a vinylidene chloride-type resin.

4. The compression-molded article of claim 1 wherein the first synthetic resin is an olefinic resin, and the second synthetic resin is an ethylene/vinyl alcohol copolymer, nylon 6/6.6 copolymer or a vinylidene chloride resin.

5. The compression-molded article of claim 1 which is a container closure, a container closure liner, or a container.

6. The compression-molded article of claim 1 wherein the first synthetic resin is a relatively low barrier to gases and the second synthetic resin is a relatively high barrier to gases.

* * * * *